Feb. 2, 1937.  L. P. YOUNG  2,069,348

HEATING UNIT

Original Filed June 20, 1934

Inventor.
Leonard P. Young
by Paul M Klein
his attorney

Patented Feb. 2, 1937

2,069,348

UNITED STATES PATENT OFFICE 2,069,348

HEATING UNIT

Leonard P. Young, New York, N. Y.

Original application June 20, 1934, Serial No. 731,443. Divided and this application May 1, 1935, Serial No. 19,144

6 Claims. (Cl. 201—67)

This invention relates to heating units in general, and particularly to the kind adapted to be employed in connection with electric soldering irons and like instrumentalities. This application represents a division of my pending application, Serial No. 731,443, filed June 20th, 1934.

The prime object of this invention is to provide a highly efficient, inexpensively manufacturable heating unit, designed to be fabricated in large quantities at the least possible expenditure, and which will be, nevertheless, effective in its transmission of heat to the instrumentality in which it is employed.

Another object of this invention is to provide in connection with such heating unit a support for the resistance element employed therein, by means of which such resistance element may be quickly and securely mounted, without affecting, at least materially so, the heat transfer from the element to the rest of the device.

Another object of this invention is to provide in conjunction with a heating element support a heat-conductive, pourable, crystalline or amorphous dielectric filler adapted firstly, to maintain the heating element in its desired position, relative to its support or other parts of the device, and secondly, to easily transfer the heat produced in the element to the exterior thereof.

The aforesaid and other objects, and a great many advantages of this invention will be more clearly understood from the ensuing specification and the accompanying drawing, which latter, although more or less serving for explanatory purposes only, form a part of my invention, but are not intended to limit the same to the specific constructions shown, and in which Figure 1 is a longitudinal, cross-sectional view through a heating unit as employed in connection with a soldering iron.

Figure 1:
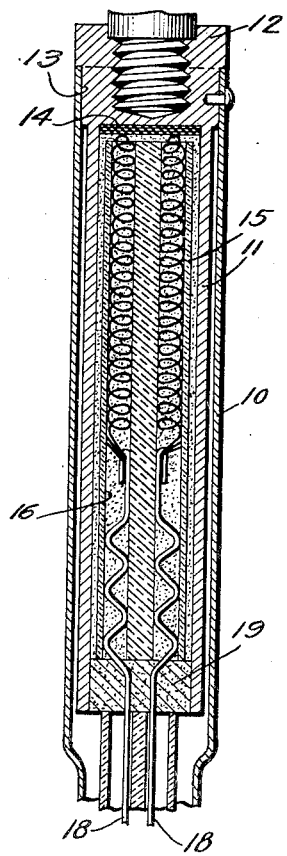
Figure 2:
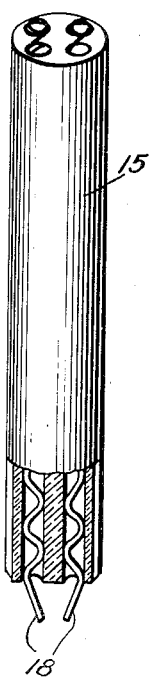
Figure 2 is a perspective view of one form of a heating element support, partially in section.
Figure 4:
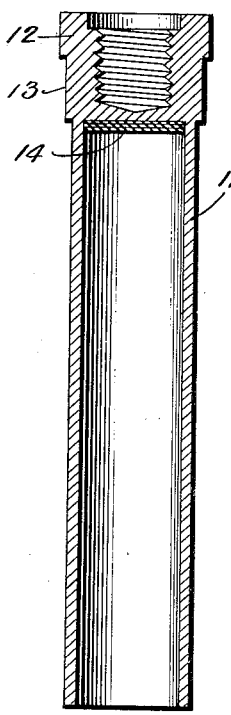
Figure 4 is a cross-sectional view through one preferred form of a casing adapted to house the heating element mounted in the support.
Figure 5:
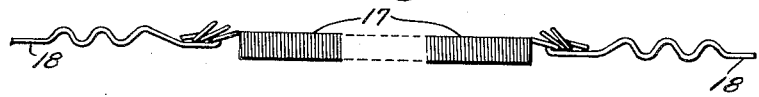
Figure 5 illustrates a helical element in its original close form, prior to being secured in a support or core.
Figure 6:
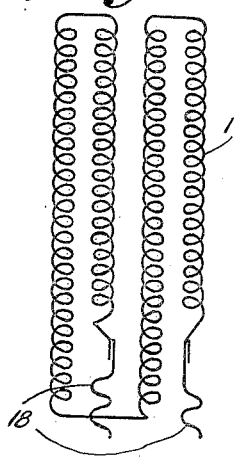
Figure 6 is a diagrammatical illustration of an expanded element, after having been secured to a core by expanding its helical windings.
Figure 3:
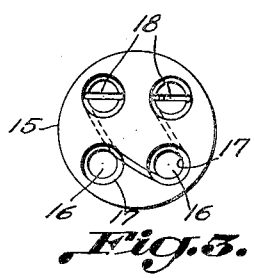
Figure 3 is an end view of the heating element support or core, seen from the bottom of Figure 2.

In the drawing, numeral 10 denotes an outer housing of a soldering iron, within which is lodged the outer casing 11 of the heating unit. The outer casing terminates in this case in a head 12, which is recessed at 13 to accommodate the outer housing 10. The interior of casing 11 is preferably cylindrical. Near the head end of the casing, there will be observed an insulating disc 14. Within the casing there is concentrically and floatingly lodged a core or support 15, such as shown in Figure 2. This support or core is provided with four through-passages 16, (see Figure 3), in which is placed heating element 17. The latter is preferably mounted in the following manner:

Its ends are inserted through two adjacent passages, until reaching the opposite end of the latter, and then the wire ends are reverted and passed through the two unused passages in opposite direction until the ends of the wires extend from without the support. At the ends of the resistance wire, there are provided undulated attaching extensions 18, which are made of electrically non-resisting material, and are intended to frictionally engage the passages from which they issue when the element is finally placed within its support.

These end wires 18 have the purpose of keeping the expanded helix of the heating element under tension for the reasons which will be explained presently. When the core, in which the heating element is suspended, is inserted into casing 11, it is held concentrically therewithin, and uniformly spaced from the inner casing walls and while thus held, a very finely powdered or granulated dry sand, preferably of crystalline form, is poured into the casing, and between the casing and the support, and also into the passages 16 of the core itself. The undulated wire ends 18, holding the heating unit under constant tension, do not permit the latter to contract to its original closed shape. When now the sand is poured into the passages, it completely fills the spaces between the loops formed by the expanded resistance wire, and holds the latter in their intended, spread position. When the filling operation is completed, a plug 19, with two minute holes, for passing the straight portion of wires 18 therethrough, is placed at the open end of casing 11, and is sealed tight. In this manner, plug 19 takes over the functions of the interior, undulated terminal ends, in frictional engagement with two passages of the element support, and prevents the poured-in sand from spilling or in any way changing its position within the casing.

By the same token, all parts contained in the casing are held immovably in place by the sealed-in sand. By thoroughly closing the originally open end of casing 11, the entire interior of the casing becomes hermetically sealed, thereby preventing the deterioration of the heating element due to oxidation or other causes. The undulations of wires 18 serve for the additional purpose of preventing straining or displacement of the sealed heating element, when pull is exerted upon the terminals, plug 19 cooperating with the wave-like wire portions of the terminals within the casing by holding the wires securely in place.

Figure 7:
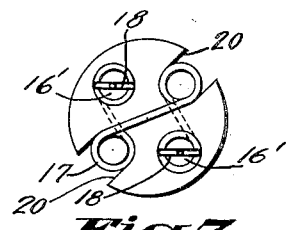
Figure 7 is an end view of a modified form of a support or core for the heating element.

A modified form of my core is shown in Figure 7. It contains two through-passages 16' and two channel formations 20, designed to accommodate and support an expanded resistance wire in a similar manner to that described in the construction shown in Figure 2. The undulated terminals 18 are preferably placed into through-passages 16' for frictionally engaging the latter and for thus holding the expanded resistance wire in channels 20 under the desired tension. Of course, it is quite obvious that the construction of the core or support may be changed, and the mounting of the resistance wire correspondingly altered. Thus instead of providing two channels and two through passages, four suitably designed channels may be employed.

Needless to say, that it is possible to provide more than four channels in a resistance wire support, and I therefore shall not be limited as to the number of channels or passages employed. In any event, if channels are used, they are to be so constructed as to permit the resistance wire to rest against the inner faces of the channels so as to prevent it from contacting with the casing 11, which is preferably made of metal, and therefore conductive to electric current.

The fact that I employ in this construction a pulverized or crystalline medium for conducting the heat from the resistance wire to the outer casing, which preferably is so constructed as to accommodate a heatable tool or the like, I simplify the manufacture of the heating unit considerably over the presently employed methods, requiring the application of poorly heat-conductive dielectric appliances, which preclude heat transfer to those parts of the device where it is most required.

Because of the simplicity and effectiveness of my construction, the resulting device is a compact unit, hermetically sealed against moisture, and prevents undue oxidation of the resistance wire, and presents a readily exchangeable article which is practically indestructible from exterior causes.

Having thus explained my invention in detail, it is quite obvious that changes and improvements may be made therein, and I therefore reserve for myself the right to make such changes and improvements, without departing from the broad scope of my invention, as set forth in the annexed claims.

I claim:

1. Heating means for electrical heating devices, comprising in combination an integral, hollow, heat-conductive casing, closed at one end and open at the other end, an element support within, and spaced from the walls of said casing, a plurality of through passages provided in said support, an originally close, helical heating element mounted expanded in all of said passages and provided with terminals having wave-shaped portions in engagement with portions of said passages, and adapted to keep said element in expanded position within the passages of said support, said wave-shaped portion terminating in straight ends extending from said casing, a hermetic seal provided at the open end of said casing, said straight terminal ends being held within said seal, and a heat-conductive pourable dielectric filling all available space in the interior of said casing.

2. In heating means for electrically heatable devices, the combination with a hermetically sealed heater casing, of an element support spaced from and fixedly suspended within said casing, a plurality of passages in said support, an originally close, helical heating element mounted expanded within said passages, and having undulated terminals disposed also within at least two of said passages and frictionally engaging the latter for keeping said element expanded during assembly, and a pourable dielectric filling all available space within the heater casing for keeping said element expanded, and said undulated terminals in their intended position, during use.

3. In electric heating means, a heat-conductive, one-piece, hollow casing having an enlarged, closed heating end and an originally open, hermetically sealed end, an element support, having a plurality of passages, fixedly mounted within and wholly spaced from said casing, an originally close, helical resistance wire mounted expanded in the passages of said support, wave-like terminals secured to the ends of said wire and frictionally engaging two of said passages for keeping said wire, during assembly, expanded and under tension said terminals extending in straight line from the sealed end of the casing, a heat-conductive, pourable dielectric filling all available space within the casing and within the passages of said element support, and an insulating member placed within the casing between the closed end thereof and said element support.

4. In a heating device, a one-piece, hollow, heat-conductive casing having an enlarged, closed heating end and an originally open end, adapted to be hermetically sealed, an element support fixedly mounted therein and spaced therefrom and comprising a refractory body provided with several through-passages for accommodating a heating element and portions of its terminals, a heating element comprising an originally close helix, mounted expanded in said passages, terminals connected with the ends of said element and having undulated portions in frictional engagement with the ends of two of said passages for keeping said element expanded during assembly, the ends of the terminals adjacent to their undulated portions being straight, and adapted to extend without said casing, a pourable refractory substance filling all available space within said casing, hermetic sealing means closing the open end of the casing and completely encasing the straight terminal ends to the beginning of their undulations, thus preventing straining of the expanded element when pull is exerted upon said terminals.

5. In electric heating means, the combination with a hermetically sealable casing of a heating element support within said casing, provided with a plurality of passages, an originally close, helical heating element mounted expanded within said passages, terminals connected at the ends of said element and provided with undulations, which latter frictionally engage said passages for keeping said element expanded and under tension, until the casing is sealed, a pourable dielectric filling all available space within the casing for keeping said element in its expanded position, while in use, a hermetic seal for the casing closing one end thereof, said terminals passing through said seal and being held by the latter against displacement.

6. In electrical heating means, the combination with a tubular casing having an enlarged, closed, heating end and an originally open end, of a heating element support fixedly suspended within said casing, provided with a plurality of passages, a heating element, comprising an originally close helix, mounted expanded in said passages, terminal wires secured to the ends of said element and provided with undulated portions, which latter frictionally engage two of said passages for keeping said element expanded, a pourable dielectric filling all available space within said casing and said passages, a closure hermetically sealing the open end of said casing, said terminal wires extending outwards through said closure, the latter preventing the movement of said terminal wires when subjected to pulling strain.

LEONARD P. YOUNG.